United States Patent
Endo

Patent Number: 5,822,754
Date of Patent: Oct. 13, 1998

[54] RECORDING AND REPRODUCING APPARATUS WITH SELECTABLE I/O CONTROL

[75] Inventor: Satoshi Endo, Kadoma, Japan

[73] Assignee: Matsushita Electric Industrial Co., Ltd., Osaka-Fu, Japan

[21] Appl. No.: 898,910

[22] Filed: Jul. 23, 1997

[30] Foreign Application Priority Data

Jul. 25, 1996 [JP] Japan .................................. 8-195896

[51] Int. Cl.$^6$ .................................................. G06F 13/00
[52] U.S. Cl. ........................ 711/112; 711/167; 711/100; 369/19
[58] Field of Search ................................. 711/112, 100, 711/167; 369/19, 47; 360/69

[56] References Cited

U.S. PATENT DOCUMENTS

| 4,351,008 | 9/1982 | Mochizuki et al. ................... 360/40 |
| 4,521,815 | 6/1985 | Tokuyama ............................. 386/79 |
| 5,432,570 | 7/1995 | Ueda et al. ........................... 396/319 |
| 5,737,478 | 4/1998 | Yamagishi et al. ..................... 386/95 |

*Primary Examiner*—Tod R. Swann
*Assistant Examiner*—J. Peikari
*Attorney, Agent, or Firm*—Panitch, Schwarze, Jacobs & Nadel, P.C.

[57] ABSTRACT

A recording and reproducing apparatus of the present invention has reproduction change detector for receiving information indicative of a detection of a reproduction operation from an in-reproduction detector, and a record change detector for receiving the information indicative of the detection of the reproduction operation of recording parts from in-record detector, thereby having excellent operability by simple switching operation.

5 Claims, 3 Drawing Sheets

RECORDING AND REPRODUCING APPARATUS WITH SELECTABLE I/O CONTROL

BACKGROUND OF THE INVENTION

The present invention relates to a recording and reproducing apparatus which has recording and reproducing mechanisms for conducting recording and reproducing operations by using a recording medium such as a cassette tape, which apparatus conducts reproduction of a compact disk, reception of radio broadcasting, and reproduction of plural music media and also conducts also recording on such music media.

Recently, an audio recording and reproducing apparatus has been remarkably developed, and many kinds of combined articles into which a tape recorder, a compact disk player, a radio receiver, and the like are incorporated are commercially produced. In such a combined article, contents of received radio broadcasting, or a recording medium such as a compact disk can be recorded onto a recording medium such as a magnetic tape which is called herein a compact cassette tape.

FIG. 3 is a block diagram showing the configuration of a portion of a conventional recording and reproducing apparatus which relates to the present invention. Although not illustrated, the conventional recording and reproducing apparatus uses a well-known driving mechanism for conducting recording and reproduction. In the driving mechanism, a motor which is a driving source is fixed onto a chassis, and the rotation of the motor is transmitted to a capstan at the same time as its speed is reduced, whereby a tape pinched between the capstan and a pinch roller is moved at a low speed. The driving mechanism comprises a reproducing head which reproduces recorded contents of the tape, a recording head which conducts recording on the tape or a recording and reproducing head which is used for both recording and reproduction, and an erasing head which erases recorded contents of the tape. The driving mechanism further comprises operating rods such as a record rod and a reproduction rod which mechanically cause the recording and reproducing apparatus to enter the record state or the reproduction state. A button is attached to each of the operating rods. When such a button is pressed by a finger, the electric circuit and the like are switched over, the operation states of the capstan and a shaft of a tape take-up reel, and the like are changed, and various operations such as reproduction, recording, and fast forward of the tape are then conducted.

A mechanism unit 100 shown in FIG. 3 is configured by juxtaposing two sets of such driving mechanisms. Two magnetic tape media which are called compact cassette tapes can be loaded into the mechanism unit 100. Among the two sets of driving mechanisms, one set is used as a mechanism dedicated to reproduction. Therefore, this driving mechanism is not provided with a record button, a record rod, and a recording head.

In the conventional recording and reproducing apparatus shown in FIG. 3, the driving mechanisms into which two compact cassette tapes are respectively loaded are indicated as "TAPE1" and "TAPE2." The unit indicated as "TAPE1" is a first driving mechanism unit 100a having a driving mechanism dedicated to reproduction, and the other unit indicated as "TAPE2" is a second driving mechanism unit 100b having a driving mechanism which can conduct both recording and reproduction.

In the conventional recording and reproducing apparatus shown in FIG. 3, a first recording medium 11 which is to be loaded into the mechanism unit 100 is used in the "TAPE1" unit, and a second recording medium 12 is used in the "TAPE2" unit.

Referring to FIG. 3, a power source controlling unit 101 controls the ON and OFF states of power sources for circuits which are used for recording and reproducing an audio signal, except a power source for a microcomputer of the recording and reproducing apparatus.

A first reproducing head 131 conducts a reproducing operation on the first recording medium 11 to read out recorded contents therefrom. As the head in this example, a magnetic reproducing head is used. A second reproducing head 141 conducts a reproducing operation on the second recording medium 12 to read out recorded contents therefrom. As the head in this example, a magnetic reproducing head is used as the head. A recording head 151 records audio signal information onto the second recording medium 12. As the head in this example, a magnetic recording head is used.

A first reproducing unit 161 is an electronic circuit which converts contents recorded on the first recording medium 11 and reproduced by the first reproducing head 131, into an audio signal.

A first reproduction rod 171 is an operating rod which moves the first driving mechanism unit 100a of the mechanism unit 100 so as to mechanically start the reproduction of the first recording medium 11. A first reproduction button 181 is attached to the first reproduction rod 171.

A second reproducing unit 191 is an electronic circuit which converts contents recorded on the second recording medium 12 and reproduced by the second reproducing head 141, into an audio signal.

A second reproduction rod 201 is an operating rod which moves the second driving mechanism unit 100b of the mechanism unit 100 so as to mechanically start the reproduction of the second recording medium 12. A second reproduction button 211 is attached to the second reproduction rod 201.

A record rod 221 is an operating rod which moves the second driving mechanism unit 100b of the mechanism unit 100 so as to mechanically start the record on the second recording medium 12. A record button 231 is attached to the record rod 221. When the record button 231 is pressed, the record rod 221 is moved and the second reproduction rod 201 is interlockingly driven.

A compact disk reproducing unit (hereinafter, abbreviated as "CD reproducing unit") 241 reproduces an audio signal recorded on a compact disk (hereinafter, abbreviated as "CD"). The CD reproducing unit 241 comprises a turn table which rotates the CD, an optical pickup which picks up information on the CD, a servo control circuit which controls the operations of the turn table and the optical pickup, and a signal processing circuit which conducts a digital process for converting information from the optical pickup into a digital signal, and then converting the digital signal into an analog signal or an audio signal.

A tuner unit 251 receives a radio wave of broadcasting such as AM or FM broadcasting, and outputs an audio signal of the broadcasting. An input switching unit 261 is a switch for selecting one of the three output signals, i.e., the output signal of the CD reproducing unit 241, that of the tuner unit 251, and that of the first reproducing unit 161 of the "TAPE1" side, as the output audio signal of the recording and reproducing apparatus. Electronic switching means such as an analog switch device is used as the input switching unit 261.

A recording unit 271 is an electronic circuit which records the output signal from the input switching unit 261, onto the second recording medium 12. A tape switching unit 281 is a switch which is used for selecting one of the output signal selected by the input switching unit 261 as the audio signal, and the output signal of the second reproducing unit 191 of the "TAPE2" side. Electronic switching means such as an analog switch device is used as the tape switching unit 281.

An audio signal processing circuit 291 connected to the tape switching unit 281 is an electronic circuit which amplifies the volume of the audio signal to a level suitable for an output from a loudspeaker, by means of changing the characteristics such as the frequency characteristics, processing, and the like. The loudspeaker 301 converts the audio signal into an acoustic signal which can be heard by an ear.

The microcomputer 31a controls the whole of the recording and reproducing apparatus. An operating unit 32a is configured by switches for controlling the ON and OFF states of a power source for the recording and reproducing apparatus, and those for enabling the user to conduct operations such the selection of the output audio signal. An audio signal selecting unit 9a of the microcomputer 31a controls the switching operations of the input switching unit 261 and the tape switching unit 281, in accordance with the operation conducted on the operating unit 32a.

Hereinafter, the description will be made with respect to the case where, in the thus configured conventional recording and reproducing apparatus, an audio signal received by the tuner unit 251 is recorded onto the second recording medium 12 and the recorded contents are reproduced so that the user can listen the recorded contents as a sound.

The user turns ON the power source through the operating unit 32a, and then selects a position of "TUNER" of a selector switch (not shown) disposed on the recording and reproducing apparatus, in order to obtain the audio signal from the tuner unit 251. This selection operation causes the audio signal selecting unit 9a to select the audio signal of the tuner unit 251 as the output signal in the input switching unit 261. At the same time, the audio signal selecting unit 9a controls the power source controlling unit 101 to supply a power so that the tuner unit 251 and other required circuits operate. As a result, the output signal of the input switching unit 261 is transmitted to the recording unit 271, and the second driving mechanism unit 100b and the recording unit 271 are set to be in the record enabled state.

At this time, the audio signal selecting unit 9a issues instructions so that the output signal of the input switching unit 261, i.e., the output signal from the tuner unit 251 is selected as the input signal of the tape switching unit 281. Therefore, the output audio signal of the tuner unit 251 is amplified by the audio signal processing circuit 291, and the audio signal of a desired broadcasting station is output from the loudspeaker 301, thereby allowing the reception state to be checked. At the timing when the contents to be recorded are started, the user operates the record button 231 so as to start the recording operation.

When the record button 231 is operated by the user, the second driving mechanism unit 100b to which the second recording medium 12 (TAPE2) is loaded, and the recording unit 271 are changed to the record enabled state. Then the recording operation on the second recording medium 12 is started. At the timing when the record of the contents to be recorded are ended, the user operates a stop button (not shown) to terminate the recording operation.

When the recorded contents are to be listened at a later time, a rewind button and the stop button which are not shown are operated so that the second recording medium 12 is rewound to a position where the record was started and the rewinding operation is then stopped.

Next, the user operates the second reproduction button 211 so that the second reproduction rod 201 is moved to set the second driving mechanism unit 100b of the mechanism unit 100 to be in the reproduction state, thereby setting the second recording medium 12 to be in the reproduction state. However, this operation is insufficient for outputting the signal of the second recording medium 12 from the loudspeaker 301. That is, the tape switching unit 281 must be set so as to select the output signal of the "TAPE2" side. To comply with this, it is required to operate the operating unit 32a so that the selector switch which is not shown is switched from the position of "TUNER" to that of "TAPE." As a result of this switching operation, the power supply to the tuner unit 251 is stopped and the input switching unit 261 selects the output of the first reproducing unit 161 of the "TAPE1" side.

In order to allow the tape switching unit 281 to select the output of the second reproducing unit 191 of the "TAPE2" side, the user must know which one of the first and second driving mechanism units 100a and 100b is being used, before the selection. In the above-mentioned case, therefore, the user determines that the driving mechanism to be used in the reproduction is the second driving mechanism unit 100b which is in the record enabled state, and operates an operation selection button "TAPE1/TAPE2" which is not shown, in the operating unit 32a, so as to select the output signal of the "TAPE2" side in the tape switching unit 281.

Only after these operations are conducted, it is possible to listen the contents of the signal which is recorded onto the second recording medium 12 and output from the tuner unit 251, through the loudspeaker 301.

In the conventional recording and reproducing apparatus, in order to listen recorded contents, the selector switch is first switched over, and the user must then conduct the operation of selecting one of the driving mechanism units of the mechanism unit 100, as the unit to be used. In other words, when an audio signal from the first or second recording medium 11 or 12 is to be listened, it is required to appropriately conduct switching operations on the two units, i.e., the input switching unit 261 and the tape switching unit 281.

In the case where an audio signal of the second recording medium 12 is to be listened immediately after the recording operation except the case where an audio signal is recorded from the first recording medium 11 to the second recording medium 12 as described in above example, particularly, the input switching unit 261 must be always set to be in the "TAPE1" side and the tape switching unit 281 must be switched to be the "TAPE2" side. These switching operations are cumbersome for the user. Consequently, there is a possibility that the user carelessly omits the operations and misunderstands that the apparatus is out of order, because of the absence of an output audio signal. In the field of a recording and reproducing apparatus, therefore, it is requested to obtain a recording and reproducing apparatus in which operations cumbersome for the user are reduced in number as much as possible so that excellent operability is attained.

BRIEF SUMMARY OF INVENTION

It is an object of the present invention to provide a recording and reproducing apparatus having excellent operability by reducing switching operations as much as possible, such as those in which, when an audio signal from the first or second recording medium is to be listened in a recording and reproducing apparatus which can conduct recording and reproducing operations on two loaded recording media, the user sets a selector switch for selecting an input source to be a tape position, and selects one of audio signals of "TAPE1" and "TAPE2" sides through an input switching unit for selecting one of the two recording media.

In order to attain the object, the recording and reproducing apparatus of the present invention comprises:

a driving mechanism having reproducing parts and recording parts, and for reproducing from a recording medium which is loaded by mechanical operations of the reproducing parts and the recording parts, and recording to the recording medium;

an in-reproduction detector for detecting an operation of the reproducing parts;

an in-record detector for detecting an operation of the recording parts;

a reproduction change detector for receiving information indicative of a detection of the operation of the reproducing parts from the in-reproduction detector;

a record change detector for receiving information indicative of a detection of the operation of the recording parts from the in-record detector;

a reproduction change judging section for, when the record change detector does not receive information indicative of a detection of the operation of the recording parts before an elapse of a predetermined time period from when the reproduction change detector receives information indicative of a detection of the operation of the reproducing parts, judging that the driving mechanism is in a reproduction state;

an input switch for selecting one of plural input signals including at least a reproduction signal from the driving mechanism; and an audio signal selector for controlling selection of the input switch to, when the reproduction change judging section judges that the driving mechanism is in a reproduction state, select the reproduction signal from the driving mechanism.

In the thus configured recording and reproducing apparatus of the present invention, the user is not required to consider the operation state of the driving mechanism means. That is, when the reproducing or recording operation is conducted, the reproduction change judging unit judges whether the reproducing operation can be conducted or not, and, on the basis of the judgment result, the audio signal selector selects a signal corresponding to the intention of the user. Therefore, the user can listen a sound reproduced from a recording medium without conducting cumbersome operations, and, in the case of recording, select a suitable input so that the recording operation is surely conducted. As a result, the present invention can provide a recording and reproducing apparatus having excellent operability.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Hereinafter, preferred embodiments of the recording and reproducing apparatus of the present invention will be described with reference to the accompanying drawings.

Figure 1:
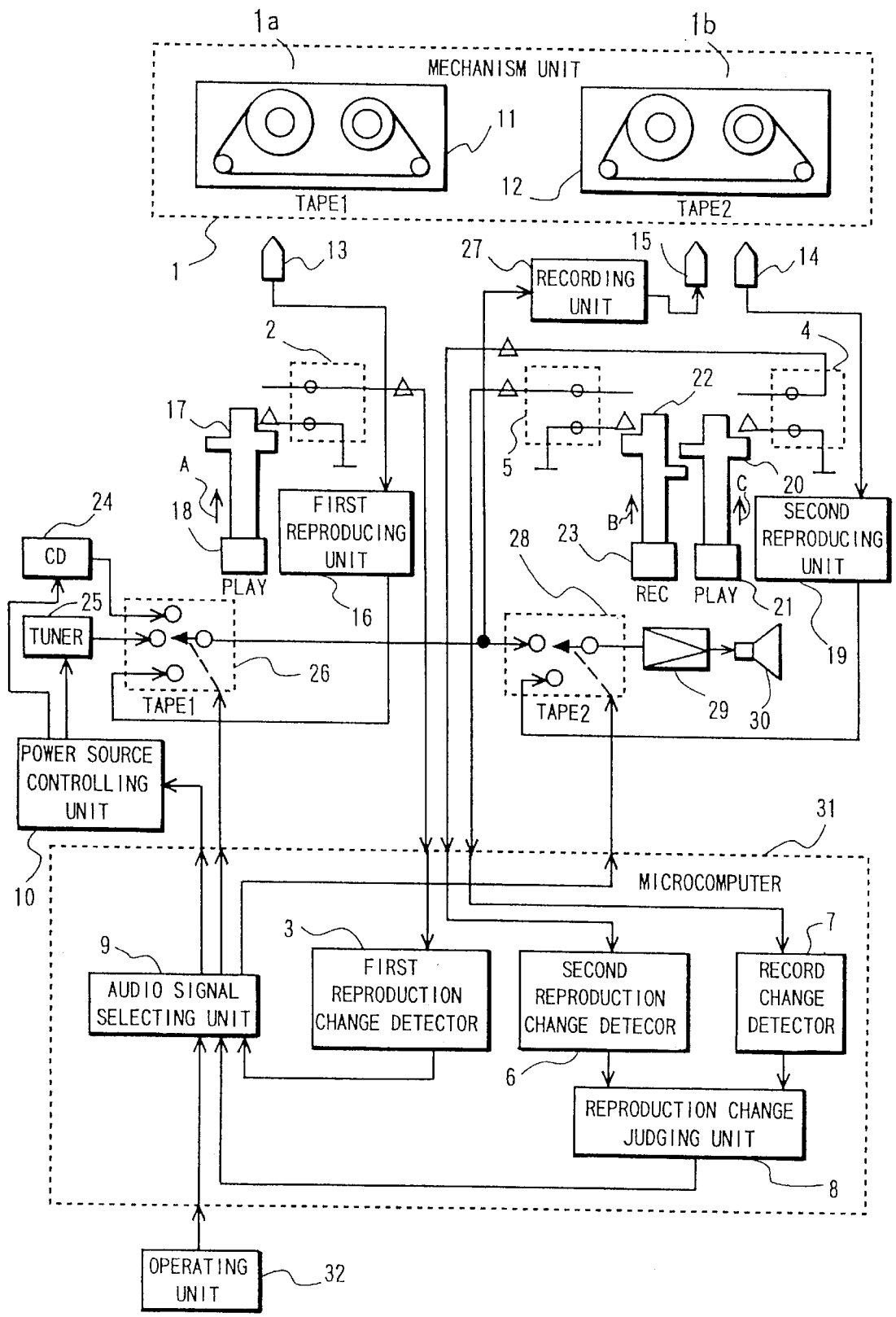
FIG. 1 is a block diagram showing main portions of a recording and reproducing apparatus which is an embodiment of the present invention.
Figure 3:
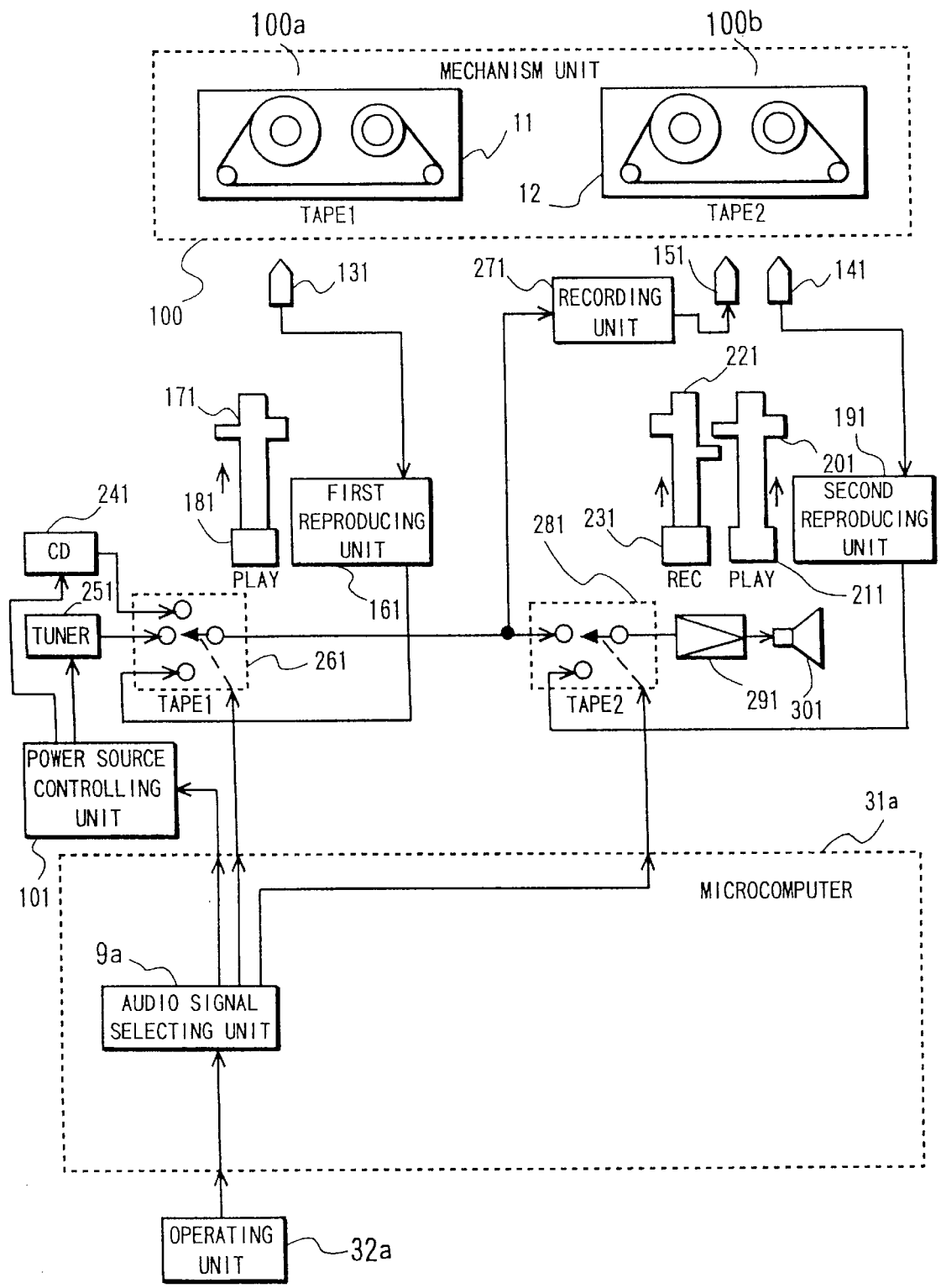
FIG. 3 is the block diagram showing a portion of the conventional recording and reproducing apparatus which relates to the present invention.

FIG. 1 is a block diagram showing main portions of a recording and reproducing apparatus which is an embodiment of the present invention. Referring to FIG. 1, in the same manner as the conventional recording and reproducing apparatus shown in FIG. 3, the driving mechanism of the embodiment is configured so that a motor, which is a driving source is fixed onto a chassis. And the rotation of the motor is transmitted to a capstan while its speed is reduced, whereby a tape pinched between the capstan and a pinch roller is moved at a low speed. The driving mechanism comprises a reproducing head for reproducing recorded contents of the tape, a recording head for conducting recording on the tape or a recording and reproducing head used both for recording and reproduction, and an erasing head for erasing recorded contents of the tape. The driving mechanism further comprises operating rods such as a record rod and a reproduction rod which mechanically cause the recording and reproducing apparatus to enter the record state or the reproduction state. A button is attached to each of the operating rods. When such a button is pressed by a finger, the electric circuit and the like are switched over, the operation states of the capstan and a shaft of a tape take-up reel, and the like are changed, and various operations such as reproduction, recording, and fast forward of the tape are then conducted.

[Configuration of the recording and reproducing apparatus]

A mechanism unit 1 shown in FIG. 1 is configured by juxtaposing two sets of such driving mechanisms. Two magnetic tape media which are called compact cassette tapes can be loaded into the mechanism unit 1. Among the two sets of driving mechanisms, one set is used as a mechanism dedicated to reproduction. Therefore, this driving mechanism is not provided with a record button, a record rod, and a recording head. In the recording and reproducing apparatus of the present invention, both the two sets of driving mechanisms may be configured so as to conduct recording and reproduction.

In the recording and reproducing apparatus of the embodiment shown in FIG. 1, the driving mechanisms into which two compact cassette tapes are respectively loaded are indicated as "TAPE1" and "TAPE2." The unit indicated as "TAPE1" is a first driving mechanism unit 1a having a driving mechanism dedicated to reproduction, and the other unit indicated as "TAPE2" is a second driving mechanism unit 1b having a driving mechanism which can conduct both recording and reproduction.

In the recording and reproducing apparatus shown in FIG. 1, a first recording medium 11 which is to be loaded into the mechanism unit 1 is used in the "TAPE1" unit, and a second recording medium 12 is used in the "TAPE2" unit.

Referring to FIG. 1, a power source controlling unit 10 controls the ON and OFF states of power sources for circuits which are used for recording and reproducing an audio signal, except a power source for a microcomputer of the recording and reproducing apparatus.

A first reproducing head 13 conducts a reproducing operation on the first recording medium 11 to read out recorded contents therefrom. In the embodiment, a magnetic reproducing head is used as the head. A second reproducing head 14 conducts a reproducing operation on the second recording medium 12 to read out recorded contents therefrom. In the embodiment, a magnetic reproducing head is used as the head. A recording head 15 records audio signal information onto the second recording medium 12. In the embodiment, a magnetic recording head is used as the head.

A first reproducing unit 16 is an electronic circuit which converts contents recorded onto the first recording medium 11 and reproduced by the first reproducing head 13, into an audio signal.

A first reproduction rod 17 is an operating rod which moves the first driving mechanism unit 1a of the mechanism unit 1 so as to mechanically start the reproduction of the first recording medium 11. A first reproduction button 18 is attached to the first reproduction rod 17.

A second reproducing unit 19 is an electronic circuit which converts contents recorded on the second recording medium 12 and reproduced by the second reproducing head 14, into an audio signal.

A second reproduction rod 20 is an operating rod which moves the second driving mechanism unit 1b of the mechanism unit 1 so as to mechanically start the reproduction of the second recording medium 12. A second reproduction button 21 is attached to the second reproduction rod 20.

A record rod 22 is an operating rod which moves the second driving mechanism unit 1b of the mechanism unit 1 so as to mechanically start the record on the second recording medium 12. A record button 23 is attached to the record rod 22. When the record button 23 is pressed, the record rod 22 is moved and the second reproduction rod 20 is interlockingly driven.

A compact disk reproducing unit (hereinafter, abbreviated as "CD reproducing unit") 24 reproduces an audio signal recorded on a compact disk (hereinafter, abbreviated as "CD"). The CD reproducing unit 24 comprises a turn table which rotates the CD, an optical pickup which picks up information on the CD, a servo control circuit which controls the operations of the turn table and the optical pickup, and a signal processing circuit which conducts a digital process for converting information from the optical pickup into a digital signal, and then converting the digital signal into an analog signal or an audio signal.

A tuner unit 25 receives a radio wave of broadcasting such as AM or FM broadcasting, and outputs an audio signal of the broadcasting. An input switching unit 26 is a device for selecting one of the three output signals, i.e., the output signal of the CD reproducing unit 24, that of the tuner unit 25, and that of the first reproducing unit 16 of the "TAPE1" side, as the output audio signal to be output from the recording and reproducing apparatus. Electronic switching means such as an analog switch device is used as the input switching unit 26.

A recording unit 27 is an electronic circuit which records the output signal from the input switching unit 26, onto the second recording medium 12. A tape switching unit 28 is a switch which is used for selecting one of the output signal selected by the input switching unit 26 as the audio signal, and the output signal of the second reproducing unit 19 of the "TAPE2" side. Electronic switching means such as an analog switch device is used as the tape switching unit 28.

An audio signal processing circuit 29 connected to the tape switching unit 28 is an electronic circuit which amplifies the volume of the audio signal to a level suitable for an output from a loudspeaker, by means of processing the characteristics such as the frequency characteristics, processing. The loudspeaker 30 converts the audio signal into an acoustic signal which can be heard by an ear.

The microcomputer 31 controls the whole of the recording and reproducing apparatus. An operating unit 32 connected to the microcomputer 31 is configured by switches for controlling the ON and OFF states of a power source for the recording and reproducing apparatus, and those for enabling the user to conduct operations such as the selection of the output audio signal to be output. An audio signal selecting unit 9 of the microcomputer 31 controls the switching operations of the input switching unit 26 and the tape switching unit 28, in accordance with the operation conducted on the operating unit 32.

Referring to FIG. 1, when the first reproduction button 18 is pressed, the reproduction rod 17 which is a first reproduction operating unit is moved in the direction of the arrow A of FIG. 1, thereby setting the first driving mechanism unit 1a of the "TAPE1" side to be in the reproduction state (PLAY mode). A first in-reproduction detector 2 is switching means for detecting the movement of the reproduction rod 17 in the direction of the arrow A of FIG. 1, to notify that the first driving mechanism unit 1a is in the reproduction state (PLAY mode).

A first reproduction change detector 3 of the microcomputer 31 detects that the state of the first driving mechanism unit 1a of the "TAPE1" side is changed from the stop state to the reproduction state for the first recording medium 11, on the basis of an output signal of the first in-reproduction detector 2.

When the second reproduction button 21 is pressed, the reproduction rod 20 which is a second reproduction operating unit is moved in the direction of the arrow C of FIG. 1, thereby setting the second driving mechanism unit 1b of the "TAPE2" side to be in the reproduction state (PLAY mode). A second in-reproduction detector 4 is switching unit for detecting the movement of the reproduction rod 20 in the direction of the arrow C of FIG. 1 thereby to notify that the second driving mechanism unit 1b of the "TAPE2" side is in the reproduction state (PLAY mode).

When the record button 23 is pressed, the record rod 22 which is a record operating unit is moved in the direction of the arrow B of FIG. 1, thereby setting the second driving mechanism unit 1b of the "TAPE2" side to be in the record state (REC. mode). An in-record detector 5 is a switching unit for detecting the movement of the record rod 22 in the direction of the arrow B of FIG. 1 thereby to notify that the second driving mechanism unit 1b of the "TAPE2" side is in the record state (REC. mode).

A second reproduction change detector 6 of the microcomputer 31 detects that the state of the second driving mechanism unit 1b of the "TAPE2" side is changed from the stop state to the reproduction state for the second recording medium 12, on the basis of an output signal of the second in-reproduction detector 4.

A record change detector 7 of the microcomputer 31 detects that the state of the second driving mechanism unit 1b of the "TAPE2" side is changed from the stop state to the record state for the second recording medium 12, on the basis of an output signal of the in-record detector 5.

When the change of the state of the second driving mechanism unit 1b of the "TAPE2" side to the reproduction state for the second recording medium 12 is detected on the basis of an output signal of the second reproduction change detector 6, a reproduction change judging unit 8 operates in the following manner. Only when, during a predetermined time period after the detection, an output signal of the record change detector 7 does not indicate that the state of the second driving mechanism unit 1b of the "TAPE2" side is changed to the record state for the second recording medium 12, the reproduction change judging unit 8 judges that the second driving mechanism unit 1b of the "TAPE2" side is surely changed to the reproduction state, and outputs a signal indicative of the judgment result.

The audio signal selecting unit 9 has a function for switching the operation states of the power source controlling unit 10, the input switching unit 26, and the tape switching unit 28, on the basis of a signal supplied from the operating unit 32 and the output signal of the first reproduction change detector 3 or the reproduction change judging unit 8.

[Operation of the recording and reproducing apparatus]

Figure 2:
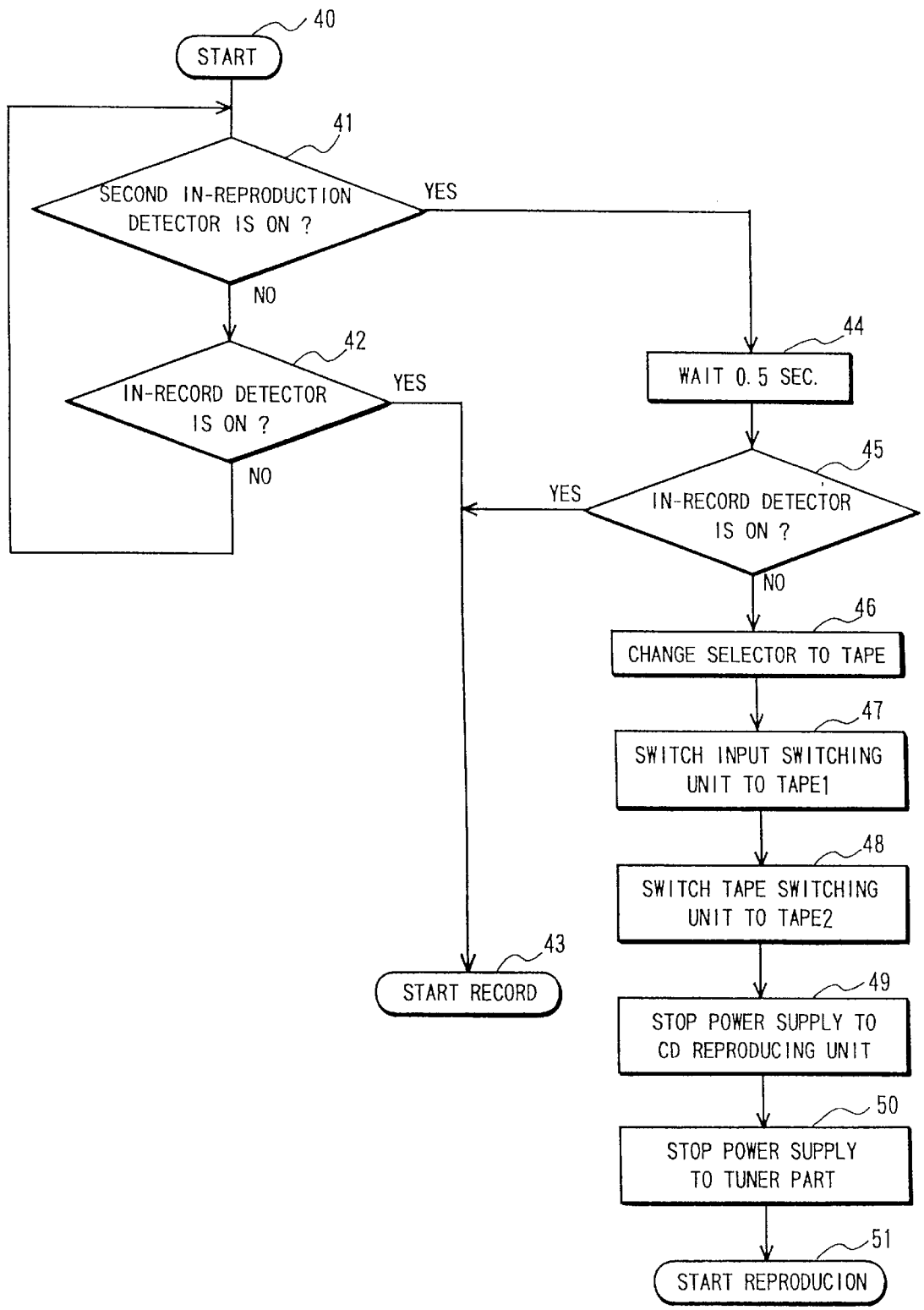
FIG. 2 is a flowchart showing main portions of the operation of a microcomputer of the embodiment.

The operation of the thus configured recording and reproducing apparatus of the embodiment will be described. FIG. 2 is a flowchart showing the recording and reproducing operations of the microcomputer 31 of the embodiment. In the same manner as the description of the operation of the conventional recording and reproducing apparatus of FIG. 3, the case where an audio signal received by the tuner unit 25 is recorded onto the second recording medium 12 and the recorded contents are reproduced so that the user can listen the recorded contents as a sound.

In the recording and reproducing apparatus of the embodiment, the user turns ON the power source through the operating unit 32, and then selects a position of "TUNER" of a selector switch in order to obtain the audio signal from the tuner unit 25. As a result, the audio signal selecting unit 9 selects the audio signal from the tuner unit 25 as the output signal in the input switching unit 26 which is a first input switching unit. At the same time, the audio signal selecting unit 9 controls the power source controlling unit 10 to supply a power so that the tuner unit 25 and other required circuits operate. As a result, the output signal of the input switching unit 26 is transmitted to the recording unit 27, thereby setting the second driving mechanism unit 1b and the recording unit 27 to be in the record enabled state.

At this time, the audio signal selecting unit 9 instructs the tape switching unit 28 which is a second input switching unit, to select the output signal of the input switching unit 26, i.e., the output signal from the tuner unit 25 as the output signal. Therefore, the audio signal which is the output signal of the tuner unit 25 is amplified by the audio signal processing circuit 29 and then outputs from the loudspeaker 30. The user checks the reception state of a desired broadcasting station based on the sound output from the loudspeaker 30, and operates the record button 23 at the timing when the contents to be recorded is started.

When the record button 23 is operated by the user, the second driving mechanism unit 1b of the mechanism unit 1 to which the second recording medium 12 is loaded, and the recording unit 27 are changed to the record enabled state. Then the recording operation on the second recording medium 12 is started. At the timing when the record of the contents to be recorded is ended, the user operates a stop button (not shown) disposed on the recording and reproducing apparatus to terminate the recording operation.

When the user wishes to listen the recorded contents after the end of the record, a rewind button (not shown) is first operated so that the second recording medium 12 is rewound, and the second recording medium 12 is then stopped by operating the stop button, at a position where the record was started.

At the timing when the second recording medium 12 is stopped at the predetermined position in this way, the operation of the microcomputer 31 shown in the flowchart of FIG. 2 is started.

Referring to FIG. 2, the process starts from step 40, and the second reproduction change detector 6 judges in step 41 whether the second in-reproduction detector 4 is ON or OFF. If the second in-reproduction detector 4 is OFF, it indicates that the second reproduction rod 20 is not at the position where the second driving mechanism unit 1b of the "TAPE2" side is in the reproduction state. Then the process proceeds to step 42.

In step 42, the record change detector 7 judges whether the in-record detector 5 is ON or OFF. If the in-record detector 5 is OFF, it indicates that the record rod 22 is not at the position where the second driving mechanism unit 1b of the "TAPE2" side is in the record state, and the process returns to step 41.

In the above-mentioned state, when the user operates the second reproduction button 21 to drive the second reproduction rod 20, thereby setting the second driving mechanism unit 1b to be in the reproduction state, the process proceeds from step 41 to step 44.

In step 44, the reproduction change judging unit 8 conducts the wait operation for a certain time period. In the embodiment, the waiting time period is set to be 0.5 sec.

Next, the record change detector 7 judges in step 45 whether the in-record detector 5 is ON or OFF. In the above-mentioned state, the record button 23 is not operated, and hence the in-record detector 5 is OFF or indicates that the record rod 22 is not at the position where the second driving mechanism unit 1b of the "TAPE2" side is in the record state.

In this way, it is ascertained that the record rod 22 is not at the position where the second driving mechanism unit 1b is in the record state. Therefore, the reproduction change judging unit 8 judges that the second driving mechanism unit 1b of the "TAPE2" side can be changed to the reproduction state, and the process proceeds to step 46.

In response to the judgment result of the reproduction change judging unit 8, the audio signal selecting unit 9 switches in step 46 the position of the selector switch to the "TAPE" position. As a result of the switching process, the display state or illumination state of a display device using an LCD (Liquid Crystal Display) or LED (Light Emitting Diode) is changed so that the user is informed of the change of the selector switch to "TAPE."

Next, in step 47, the audio signal selecting unit 9 switches the input switching unit 26 to the "TAPE1" side, and the process proceeds to step 48.

In step 48, the tape switching unit 28 is switched to the "TAPE2" side. Next, the power supply to the CD reproducing unit 24 is stopped in step 49, and that to the tuner unit 25 is stopped in step 50.

In step 51, the reproducing operation of the second driving mechanism unit 1b of the "TAPE2" side is started.

The operation of stopping the power supply to the CD reproducing unit 24 in step 49, and that of stopping the power supply to the tuner unit 25 in step 50 are conducted in order to reduce the power consumption and prevent the CD reproducing unit 24 and the tuner unit 25 from generating noises and radiating unwanted electromagnetic waves.

By contrast, if the in-record detector 5 is ON in step 45, it indicates that the record rod 22 is at the position where the second driving mechanism unit 1b of the "TAPE2" side is in the record enabled state. If this state is attained, the process proceeds to step 43 and the recording operation is started.

The above-mentioned wait operation in step 44 is conducted in order to prevent the following problem from arising.

The second reproduction rod 20 and the record rod 22 are structured as shown in FIG. 1. That is, when the record button 23 is operated upward (in the direction of the arrow B of FIG. 1), a projection of the record rod 22 abuts against that of the second reproduction rod 20, so that the second reproduction rod 20 is simultaneously pushed upward (in the direction of the arrow C of FIG. 1) by the record rod 22. In other words, the upward operation of the record button 23 results in an operation in which the record button and the reproduction button 21 are simultaneously pressed. Therefore, the second in-reproduction detector 4 and the in-record detector 5 are changed to the ON state at a substantially same timing. However, the two detectors are not always turned ON at the same timing. For example, there is a time difference between the case where the record button 23 is pressed quickly with full force and that where the button is pressed slowly and gently. Furthermore, produced apparatuses have timing variations respectively characteristic to the apparatuses.

If the operations of steps 44 and 45 are not conducted, there arises a problem as follows. In the case where the user operates the recording button 23 in order to conduct the record from a CD or the TUNER to the second recording medium 12, when the turn-ON timing of the second in-reproduction detector 4 is faster by even a short time period than that of the in-record detector 5, it is judged that the in-record detector 5 is not turned ON, and step 46 and the subsequent steps are executed, with the result that the selector switch is forcedly changed to the position of "TAPE." Therefore, the record from a CD or the TUNER to the second recording medium 12 which is originally intended by the user cannot be conducted. To comply with this, the above-mentioned wait operation in step 44 is conducted in the recording and reproducing apparatus of the embodiment.

In the above, the embodiment in which, when the recording rod 22 is operated in order to set the second driving mechanism unit 1b of the "TAPE2" side to be in the record state, also the second reproducing rod 20 is interlockingly driven has been described. The present invention may be applied to a recording and reproducing apparatus in which the recording rod 22 and the second reproducing rod 20 are not interlocked with each other.

As described above, in the recording and reproducing apparatus of the embodiment, the difference between the operation timings of the reproduction button 21 and the record button 23 is absorbed by the wait operation in step 44. Therefore, the second reproduction change detector 6 surely detects the reproduction state in accordance with the operation state of the second in-reproduction detector 4, and the record change detector 7 surely detects the record state in accordance with the operation state of the in-record detector 5. The reproduction change judging unit 8 can correctly judge the state of the recording and reproducing apparatus on the basis of the detection results of the second reproduction change detector 6 and the record change detector 7. In accordance with the judgment result, the audio signal selecting unit 9 appropriately switches the input switching unit 26 and the tape switching unit 28. As described above, in the recording and reproducing apparatus of the embodiment, the objective operation is automatically conducted. Therefore, the desired operation can be conducted surely and easily without requiring the user to conduct any cumbersome operation.

In the recording and reproducing apparatus of the embodiment, when only the reproduction button 18 of the first driving mechanism unit 1a of the "TAPE1" side is operated, the first in-reproduction detector 2 is turned ON, and hence the first reproduction change detector 3 outputs a signal for setting the first driving mechanism unit 1a to be in the reproduction state. At this time, the audio signal selecting unit 9 switches the tape switching unit 28 to the side for the output of the input switching unit 26, and at the same time the input switching unit 26 to the "TAPE1" side. As a result, the tape switching unit 28 is connected to the output of the first reproducing unit 16 and the audio signal of the first recording medium 11 which is reproduced by the first reproducing head 13 is output from the loudspeaker 30. In this case, the CD reproducing unit 24 and the tuner unit 25 are not powered ON so as not to operate.

As described above, in the recording and reproducing apparatus of the embodiment, when an audio signal from the first or second recording medium 11 or 12 is to be listened, the user is not required to conduct the operations of switching the selector switch to the "TAPE" position, and checking the audio signals from the "TAPE1" and "TAPE2" sides to select one of the audio signals, unlike the conventional apparatus. Therefore, it is possible to provide a recording and reproducing apparatus having excellent operability.

In the above, the embodiment in which the two sets of driving mechanisms are used has been described. The concept of absorbing the lag of the operation timing may be applied to a case where a single driving mechanism is used. Specifically, the embodiment described above may be modified so that the first driving mechanism unit 1a is not disposed, only the second driving mechanism unit 1b is used, the first input switching unit 26 is not disposed, and the tape switching unit 28 is provided with positions of "CD" and "TUNER." Also in the modification, when the second driving mechanism unit 1b is set to be in the reproduction state, the reproduction of the recording medium 12 is surely conducted, and, when the second driving mechanism unit 1b is disposed to be set to be in the record state, the record state can be surely detected irrespective of the degree of the difference between the timings of operating the buttons. Even in a recording and reproducing apparatus having a mechanism in which the lag of the operation timing is absorbed by using a single driving mechanism, therefore, the input selection is prevented from being erroneously conducted.

In the above, the embodiment in which a compact cassette tape is used as the first recording medium has been described. Alternatively, a recording medium of another kind, such as a magnetic disk, an optical disk, or an optical magnetic disk may be used.

The embodiment is configured so that the CD reproducing unit and the tuner unit are disposed in the recording and reproducing apparatus. Alternatively, these units may be housed in a case other than that housing the driving mechanism unit, the microcomputer, and the like, and the units and the other components may be connected to each other through cables, optical transmission lines, and the like, thereby attaining the operations same as those of the embodiment.

The values of the waiting time period, and the like which are used in the description of the embodiment are examples. The present invention is not restricted to the values.

As described above, the recording and reproducing apparatus of the present invention comprises:

a driving mechanism unit which is driving mechanism for reproducing from a recording medium which is loaded by mechanical operations of reproducing parts and recording parts, and recording to the recording medium;

an in-reproduction detector which provided for detecting an operation of the reproducing parts;

an in-record detector which is provided for detecting an operation of the recording parts;

a reproduction change detector which is provided for detecting the operation of the reproducing parts from the in-reproduction detector;

a record change detector which is provided for detecting the operation of the recording parts from the in-record detector;

a reproduction change judging unit which is reproduction change judging section for, when the record change detector does not detect the operation of the recording parts before an elapse of a predetermined time period from when the reproduction change detector detects the operation of the reproducing parts, judging that the driving mechanism unit is in a reproduction state;

an input switching unit which is input switch for selecting one of plural input signals including a reproduction signal from the driving mechanism unit; and an audio signal selector for controlling selection of the input switching unit to, when the reproduction change judging unit judges that the driving mechanism unit is in a reproduction state, select the reproduction signal from the driving mechanism unit.

Since the recording and reproducing apparatus of the present invention is configured as described above, an output signal from a recording medium is automatically selected as the audio signal at a start of the reproduction, and the recording from a desired input source can be surely conducted on a desired recording medium at a start of the recording. Therefore, the recording and reproducing apparatus of the present invention can realize recording and reproducing operations having excellent operability and high reliability.

Furthermore, the recording and reproducing apparatus of the present invention comprises:

a first driving mechanism unit which is first driving mechanism for conducting reproduction from a recording medium or the like which is loaded by a mechanical operation of first reproducing parts;

a second driving mechanism unit which is second driving mechanism for reproducing from a recording medium which is loaded by mechanical operations of second reproducing parts and recording parts, and recording to the recording medium;

a first in-reproduction detector which is provided for detecting an operation of the first reproducing parts;

a second in-reproduction detector which is provided for detecting an operation of the second reproducing parts;

an in-record detector which is provided for detecting an operation of the recording parts;

a first reproduction change detector which is provided for detecting the operation of the first reproducing parts from the first in-reproduction detector;

a second reproduction change detector which is provided for detecting the operation of the second reproducing parts from the second in-reproduction detector;

a record change detector which is provided for detecting the operation of the recording parts from the in-record detector;

a reproduction change judging unit which is reproduction change judging section for, when the record change detector does not detect the operation of the recording parts before an elapse of a predetermined time period from when the second reproduction change detector detects the operation of the second reproducing parts, judging that the second driving mechanism unit is in a reproduction state;

a first input switching unit which is first input switch for selecting one of plural input signals including at least a reproduction signal from the first driving mechanism unit;

a second input switching unit which is second input switch for selecting one of plural input signals including at least a reproduction signal from the second driving mechanism unit; and an audio signal selector for controlling selection of the first and second input switching units, and for controlling selection of the second input switching unit to, when the reproduction change judging unit judges that the second driving mechanism unit is in a reproduction state, select the reproduction signal from the second driving mechanism unit.

Since the recording and reproducing apparatus of the present invention is configured as described above, an output signal from a recording medium is automatically selected as the audio signal at a start of the reproduction, and the state of the audio signal selector is not changed at a start of the record. Therefore, a recording and reproducing apparatus in which the recording is not disturbed can be realized.

Furthermore, the present invention is configured so that, when the first reproduction change detector judges that the first driving mechanism is in a reproduction state, the audio signal selector controls the first input switching unit to select the reproduction signal from the first driving mechanism, and the second input switching unit to select the output signal from the first input switching unit. When the reproduction is to be conducted by the first driving mechanism, therefore, the reproduction can be executed by controlling the second input switching unit to select the reproduction output from the first driving mechanism.

As described above, according to the recording and reproducing apparatus of the present invention, when an audio signal from a recording medium is to be listened, the reproduction change judging unit which is the reproduction change judging unit is configured so as to wait a predetermined time period after the detection of the movement of the reproduction operating parts. In the recording and reproducing apparatus of the present invention, when a movement of the recording parts is not detected during the waiting time period, it is judged that the apparatus is in the reproduction state, and the selection operation is conducted so as to output a signal reproduced from the recording medium. In the recording and reproducing apparatus of the present invention, therefore, switching operations are reduced in number and can be easily conducted, and the user is not required to conduct the switching operations after the user judges the operation state of a driving mechanism. Consequently, the apparatus has excellent operability. Furthermore, the recording and reproducing apparatus of the present invention has a superior advantage that the recording operation is easy and does not interfere with the reproduction operation.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

I claim:

1. A recording and reproducing apparatus comprising:
a driving mechanism having reproducing parts and recording parts, and being for reproducing from a recording medium which is loaded by mechanical operations of said reproducing parts and said recording parts, and for recording to said recording medium, respectively;

an in-reproduction detector for detecting an operation of said reproducing parts;

an in-record detector for detecting an operation of said recording parts;

a reproduction change detector for receiving information indicative of a detection of the operation of said reproducing parts from said in-reproduction detector;

a record change detector for receiving information indicative of a detection of the operation of said recording parts from said in-record detector;

a reproduction change judging unit for, when said record change detector does not receive information indicative of a detection of the operation of said recording parts before an elapse of a predetermined time period from when said reproduction change detector receives information indicative of a detection of the operation of said reproducing parts, judging that said driving mechanism is in a reproduction state;

an input switch for selecting one of plural input signals including at least a reproduction signal from said driving mechanism; and an audio signal selector for controlling selection of said input switch to, when said reproduction change judging unit judges that said driving mechanism is in a reproduction state, select the reproduction signal from said driving mechanism.

2. A recording and reproducing apparatus comprising:

a first driving mechanism having first reproducing parts, and being for conducting reproduction from a recording medium which is loaded by a mechanical operation of said first reproducing parts;

a second driving mechanism having second reproducing parts and recording parts, and for reproducing from a recording medium which is loaded by mechanical operations of said second reproducing parts and said recording parts, and recording to said recording medium;

a first in-reproduction detector for detecting an operation of said first reproducing parts;

a second in-reproduction detector for detecting an operation of said second reproducing parts;

an in-record detector for detecting an operation of said recording parts;

a first reproduction change detector for detecting the operation of said first reproducing parts from said first in-reproduction detector;

an second reproduction change detector for detecting the operation of said second reproducing parts from said second in-reproduction detector;

a record change detector for receiving information indicative of a detection of the operation of said recording parts from said in-record detector;

a reproduction change judging unit for, when said record change detector does not receive information indicative of a detection of the operation of said recording parts before an elapse of a predetermined time period from when said second reproduction change detector receives information indicative of a detection of the operation of said second reproducing parts, judging that said second driving mechanism is in a reproduction state;

a first input switch for selecting one of plural input signals including at least a reproduction signal from said first driving mechanism;

a second input switch for selecting one of plural input signals including at least a reproduction signal from said second driving mechanism; and an audio signal selector for controlling selection of said first and second input switches, and for controlling selection of said second input switch to, when said reproduction change judging unit judges that said second driving mechanism is in a reproduction state, select the reproduction signal from said second driving mechanism.

3. A recording and reproducing apparatus in accordance with claim 2, wherein, when said first reproduction change detector judges that said first driving mechanism is in a reproduction state, said audio signal selector controls said first input switch to select the reproduction signal from said first driving mechanism, and said second input switch to select the output signal from said first input switch.

4. A recording and reproducing apparatus in accordance with claim 2, wherein said first driving mechanism is configured so as to have said reproducing parts and recording parts, and said in-record detector is configured so as to detect operations of said recording parts of said first driving mechanism and said recording parts of said second driving mechanism.

5. A recording and reproducing apparatus in accordance with claim 2, wherein said first in-reproduction detector for detecting the operation of said first reproducing parts, said second in-reproduction detector for detecting the operation of said second reproducing parts, and said in-record detector for detecting the operation of said recording parts are respectively configured by mechanical contacts which are interlocked with said first driving mechanism and said second driving mechanism.

* * * * *